United States Patent [19]
Wulf

[11] Patent Number: 5,485,719
[45] Date of Patent: Jan. 23, 1996

[54] INTEGRATION OF COMBUSTOR-TURBINE UNITS AND INTEGRAL-GEAR PRESSURE PROCESSORS

[75] Inventor: James B. Wulf, Williamsville, N.Y.

[73] Assignee: Praxair Technology, Inc., Danbury, Conn.

[21] Appl. No.: 308,907

[22] Filed: Sep. 20, 1994

Related U.S. Application Data

[60] Division of Ser. No. 30,742, Mar. 12, 1993, Pat. No. 5,402,631, which is a continuation-in-part of Ser. No. 698,125, May 10, 1991, abandoned.

[51] Int. Cl.⁶ .................................................. F02C 3/08
[52] U.S. Cl. ........................... 60/39.07; 60/726; 415/66
[58] Field of Search ............................. 60/39.07, 39.75, 60/726; 415/60, 66; 74/DIG. 5

[56] References Cited

U.S. PATENT DOCUMENTS

| | | | |
|---|---|---|---|
| 2,407,165 | 9/1946 | Kreitner | 60/39.04 |
| 2,874,585 | 2/1959 | Lasley | 74/DIG. 5 |
| 3,001,692 | 9/1961 | Schierl | 415/66 |
| 3,658,442 | 4/1972 | Heitmann et al. | 417/243 |
| 3,659,417 | 5/1972 | Grieb | 60/39.07 |
| 3,786,696 | 1/1974 | Aleem | 60/39.142 |
| 4,043,120 | 8/1977 | Hoffeins | 60/39.142 |
| 4,077,748 | 3/1978 | Potz | 417/319 |
| 4,219,306 | 8/1980 | Fujino et al. | 415/66 |
| 4,224,045 | 9/1980 | Olszewski et al. | 62/30 |
| 4,473,754 | 9/1984 | Joy | 290/54 |
| 4,514,976 | 5/1985 | Christoff | 60/39.07 |
| 4,522,024 | 6/1985 | Zaugg | 60/39.05 |
| 4,684,081 | 8/1987 | Cronin | 244/58 |
| 4,759,997 | 7/1988 | Ohyauchi et al. | 60/39.07 |
| 4,819,423 | 4/1989 | Vershure et al. | 60/39.02 |
| 4,896,499 | 1/1990 | Rice | 60/39.162 |
| 5,285,626 | 2/1994 | Leeson | 60/39.07 |
| 5,323,603 | 6/1994 | Malohn | 60/39.07 |
| 5,382,132 | 1/1995 | Mendel | 415/60 |

FOREIGN PATENT DOCUMENTS

| | | | |
|---|---|---|---|
| 0076529 | 9/1982 | European Pat. Off. | |
| 1484133 | 5/1967 | France . | |
| 2289741 | 5/1976 | France . | |
| 84400 | 10/1956 | Netherlands . | |
| 0992651 | 7/1962 | United Kingdom | 415/66 |
| 2067665 | 7/1981 | United Kingdom | 60/39.02 |

*Primary Examiner*—Louis J. Casaregola
*Attorney, Agent, or Firm*—Leisa M. Smith; Stanley Ktorides

[57] ABSTRACT

A method and system for supplying compressed air to a process plant using a combustor-turbine unit directly coupled to a bull gear meshing with pinions on which are mounted gas compression stages and expansion stages. Some stages compress a stream of air supplied to the combustor-turbine unit for combustion and to the process plant. Other stages expand or compress other gas streams directed to the combustor-turbine unit or to external applications. Direct energy transfers and intercooling and aftercooling after compression stages enhance the efficiency of the system.

6 Claims, 7 Drawing Sheets

Fig. 9

INTEGRATION OF COMBUSTOR-TURBINE UNITS AND INTEGRAL-GEAR PRESSURE PROCESSORS

This application is a division of prior U.S. application Ser. No. 08/030,742, filed Mar. 12, 1993, now U.S. Pat. No. 5,402,631, and/which is a CIP of application Ser. No. 07/698,125, filed May 10, 1991, now abandoned.

TECHNICAL FIELD

This invention pertains to a system and a method for integrating combustor-turbine units and multistage integral gear pressure processors for the purpose of supplying compressed air to both a process plant and to the combustor-turbine units.

BACKGROUND

A process plant compressor is typically driven by a motor receiving electricity from a central supply system, or by a motor receiving electricity from a generator driven by a gas turbine or other engine, or directly by a gas turbine engine. Cost of equipment and operation, being of prime importance, provides incentive to avoid use of a motor and to drive the compressor with a gas turbine engine. However, the operating speed of the gas turbine engine may not match the operating speed of the compressor. To match speeds, a gear system is required adding some cost and power loss.

Process plant compressors are typically radial compressors having a large diameter bull gear with meshing pinions upon the ends of which compression impellers are mounted. The multiple impellers within their own respective housings provide several stages of compression as desired. The bull gear and its meshing pinions are contained within a common housing. Consequently such compressors are known as integral-gear compressors. The pinions may have differing diameters to best match the speed requirements of the compression impellers that they drive. The compressed air between any two stages is ducted to an intercooler, wherein it is cooled, thereby providing a more efficient compression process. Such compressors are not expensive, but are heavy, require much space and a supply of coolant for the intercoolers. All of these conditions are readily acceptable in a process plant such as a cryogenic air separation plant which requires a large continuous flow of compressed air supplied at minimum cost.

Advantageously, an integral-gear compressor may be driven by a gas turbine engine with its output shaft coupled to the bull gear or to a pinion meshing with the bull gear in the processor. Thus the cost and power loss of an additional gear system is avoided. However still additional improvement is possible by the use of this invention.

Typically a stationary gas turbine engine has been derived from an aircraft gas turbine engine which requires low weight, compactness and small frontal area. Thus typically gas turbine engines have axial compression stages without intercooling in order to achieve these requirements. The mechanical difficulty of extracting compressed air between closely spaced axial stages, cooling it, and reinjecting the cooled air precludes intercooling in axial compressors. The compressor stages in a gas turbine engine are housed within the casing which houses the other components.

Since axial compressors in gas turbine engines are small and do not employ intercooling, their efficiency is lower than that of process plant compressors employing intercooling. For example, intercooling in a compressor with four compression stages providing an overall compression ratio of 7.9, reduces the power required for compression by 20% over that required without intercooling. In a gas turbine engine however, the turbine typically must produce two units of power to drive its compressor for each unit of power delivered through its power output shaft. Thus in a gas turbine engine, 20% increase in compression efficiency results in a 40% increase in power output when some of the heat in the exhaust from the turbine is used to heat the air entering the combustor from the intercooled air compressor. Hence a large improvement in efficiency can be secured by supplying the compressed air required by the gas turbine engine combustor from a process compressor employing intercooling. The process compressor can be sized to provide only sufficient air for the gas turbine combustor, which then can be used as a power producer. The process compressor can be sized to provide more than sufficient air for the gas turbine combustor, the additional air being ducted to a process plant for use therein. A single process compressor may serve to supply more than one gas turbine combustor and compress more than one fluid. Many combinations of the above mentioned uses are possible.

The gas turbine without its integral compressor is basically a combustor and turbine and can be termed a combustor-turbine unit. Existing models of gas turbine engines can be manufactured as combustor-turbine units merely by leaving out the compressor blades, thus saving on fabrication cost.

In a process plant, discharging or intermediate gas streams often are available that can be employed to increase power production, produce refrigeration, reduce fuel consumption or reduce emissions. An available stream of compressed air can be boosted in pressure to the pressure of the combustor in the combustor-turbine unit. Similarly, an available stream of compressed gas with little or no oxygen content can be boosted in pressure and used in the combustor of the combustor-turbine unit as a replacement for a portion of the air normally supplied. An available stream with some fuel content, i.e., a fuel gas stream, can be burned in the combustor thus reducing the amount of primary fuel required. An available steam stream can be injected into the combustor for power augmentation or emission reduction. Available gas streams can be expanded as well as compressed before being discharged or introduced into the gas-turbine unit.

Such streams can be advantageously processed in a machine such as an integral gear compressor fitted with stages to compress one or more gas streams, and additionally, stages to expand one or more compressed gas streams. The energy recovered in the expansion of a gas stream will be transferred directly into compression of another gas stream. Such an integral gear machine, having compression and optional expansion stages, shall herein be termed an integral-gear pressure processor. Thus pressure processing of a gas stream shall mean compression or expansion of the gas stream, and a pressure processing stage shall mean a compression stage or an expansion stage. Integral-gear pressure processors may be employed in combinations to accomplish all of the compression and expansion functions needed.

It is an object of this invention to provide systems and methods for more efficient supply of compressed air or gas for supply to a process plant or other external use.

It is a feature of this invention that a combustor-turbine unit is directly coupled to drive the bull gear of an integral-gear multi-stage pressure processor for supplying compressed air to a process plant and the combustor-turbine unit itself.

It is an advantage of this invention that an integral-gear pressure processor provides machinery of attractive mechanical structure and efficiency to compress and expand multiple gas streams.

SUMMARY OF THE INVENTION

This invention provides an improved method and system for supplying compressed air or other gas for withdrawal from the system. A system embodiment comprises a combustor-turbine unit having an output shaft and an integral-gear pressure processor having a bull gear drivingly coupled to at least one integral-gear pressure-processing compression stage. The system includes conduit for ducting a portion of the compressed gas stream from one of the integral-gear pressure processing stages to the combustor-turbine unit. Most commonly the gas is compressed air which is ducted to the combustor-turbine unit to support combustion. The system includes means for driving the bull gear with the combustor-turbine-unit shaft. In one embodiment of the invention, the means is a pinion mounted on the shaft and meshing with the bull gear. In another embodiment, the means is a pinion mounted on the shaft and meshing with another pinion which in turn meshes with the bull gear.

In still another embodiment, the system further comprises a combustor-turbine-unit pressure processing stage drivingly engaged with a turbine shaft of the combustor-turbine unit and communicating with an integral-gear pressure processing stage.

In yet another embodiment, the system further comprises a second integral-gear pressure processor having a bull gear drivingly connected with at least one integral-gear pressure processing stage which has an inlet to atmospheric air. The inlet of a first integral-gear pressure processing stage is optionally connectable to either the exit of the second integral-gear pressure processing stage or to atmospheric air. The combustor-turbine unit shaft drives both the bull gear of the first integral-gear pressure processor and the bull gear of the second integral-gear pressure processor.

DESCRIPTION OF THE PREFERRED EMBODIMENTS

Figure 1:
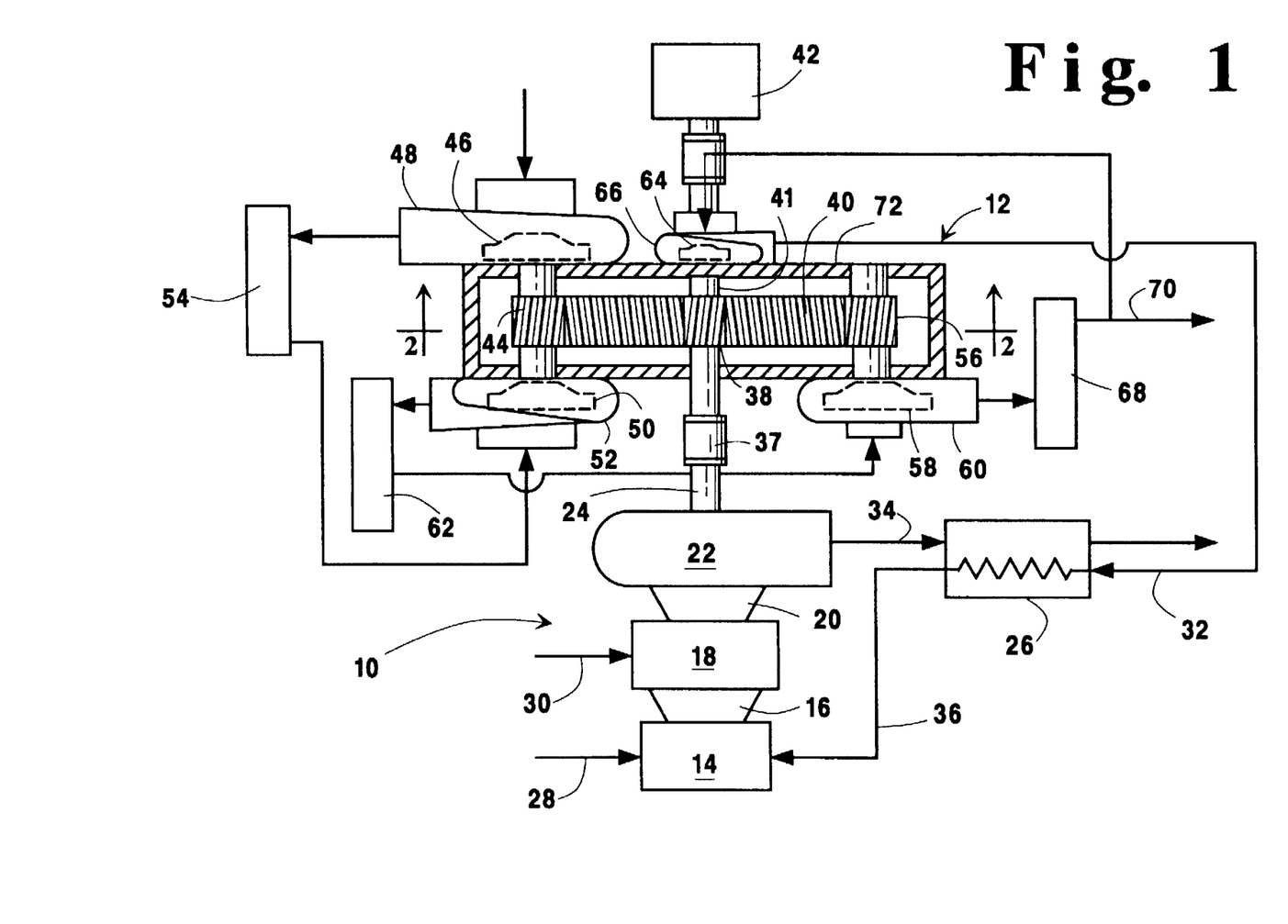
FIG. 1 is a schematic plan view of a system embodying this invention.
Figure 2:
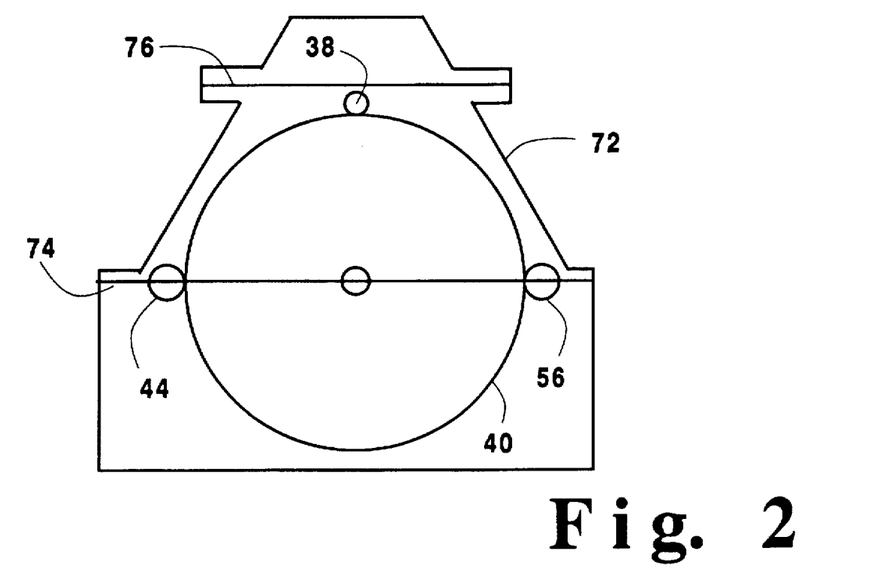
FIG. 2 is a vertical section of FIG. 1 along the line 2—2 in FIG. 1.

A system embodiment pursuant to this invention, as shown in FIG. 1 and FIG. 2, comprises a combustor-turbine unit 10 integrated with an integral-gear gas compressor 12. The combustor-turbine unit includes a combustor 14, a first stage turbine 16, a reheater 18, a second stage turbine 20, an exhaust gas collector 22, an output shaft 24 and a regenerative heat exchanger 26. Entering the combustor 14 is a flow 28 of fuel, which may be either liquid or gaseous. Entering the reheater 18 is a second flow 30 of fuel. A compressed air stream 32 from the integral-gear compressor enters the regenerative heat exchanger 26 where it is preheated by exchange against the exhaust gas flow 34 from the collector. The preheated compressed air flow 36 then enters the combustor 14.

Typically means for driving said bull gear with said combustor-turbine-unit shaft comprising a driving pinion coupled to said turbine output shaft and meshing with said bull gear; or a driving pinion coupled to said turbine output shaft and meshing with another pinion meshing with said bull gear.

The combustor-turbine output shaft 24 includes a coupling 37 and a means for driving the bull gear 40 of the compressor 12. Conventionally, bull gear means the main gear, usually the largest and strongest, in a gear train. Typically a bull gear in an integral-gear compressor rotates at about 1200 rpm, while typically the shaft of a combustor-turbine unit rotates at from about 3600 to about 12,000 rpm. Thus a mechanism for speed reduction is needed to drive the bull gear with the combustor-turbine unit. In the embodiment of the invention to which FIG. 1 is directed, the means for driving the bull gear 40 with the combustor-turbine output shaft 24 is a pinion 38 carried on the shaft 24 and meshing with the bull gear 40. This means of speed reduction saves from 2 to 3% of the power transmitted which would ordinarily be lost in more complex transmissions. The term pinion is used here conventionally, to mean a smaller gear than the bull gear. The pinion 38 is sized to drive the bull gear 40 at an appropriate speed. The bull gear shaft 41 is coupled to an electrical motor 42 for starting the combustor-turbine unit 10. During normal operation of the combustor-turbine unit 10 and the compressor 12, the motor 42 can be operated as a generator to supply power to other parts of the process plant.

Also meshing with the bull gear 40 is a second pinion 44 on which are mounted a first radial impeller 46 enclosed by a housing 48, and a second radial impeller 50 enclosed by a housing 52. Each impeller within its housing provides a stage of compression. Compressed air from the first stage passes through an intercooler 54 en route to the second stage. Also meshing with the bull gear 40 is a third pinion 56 on which is mounted a third radial impeller 58 which, with its housing 60, provides a third stage of compression.

Compressed air from the second stage passes through a second intercooler 62 en route to the third stage. Also mounted on the first pinion 38 is a fourth radial impeller 64 which, with its housing 66, provides a fourth stage of compression. Compressed air from the third stage passes through a third intercooler 68 en route to the fourth stage. From this fourth stage, the compressed air stream 32 flows to the regenerative heat exchanger 26 for preheating.

A compressed air stream 70 is taken from the third compression stage and directed to the process plant according to FIG. 1. However, process plant air and combustor air may be taken from any combination of stages as may be desirable. More than or fewer than three stages can be used to compress the process streams. More than or fewer than four stages can be used to compress the combustion air stream.

Two pinions meshing with a bull gear are most easily accommodated by locating them at the usual split line of the gearcase which is at the horizontal centerline 74 of the gearcase 72. A third pinion can be accommodated by an additional horizontal split line 76 in the gearcase just above the top of the bull gear 40.

To start a combustor-turbine unit and its associated compressor, the system must be rotated by another medium at some speed, typically 20% of the normal operating speed of the combustor-turbine unit. As shown in FIG. 1, an electric motor 42 is coupled to bull gear shaft 41 for starting the combustor-turbine unit 10. During steady-state operation, the motor 42 can be used as a generator of electric power. Alternatively the starter could be coupled through some gearing to a pinion meshing with the bull gear (arrangement not shown).

The integration of the combustor-turbine unit with the integral-gear compressor allows all the necessary changes of speed to occur within the gear case of the compressor, which is both economical in equipment and efficient in operation. The supply of compressed air from the intercooled integral gear compressor to the combustor-turbine unit for combustion provides a large increase in efficiency of operation.

Figure 3:
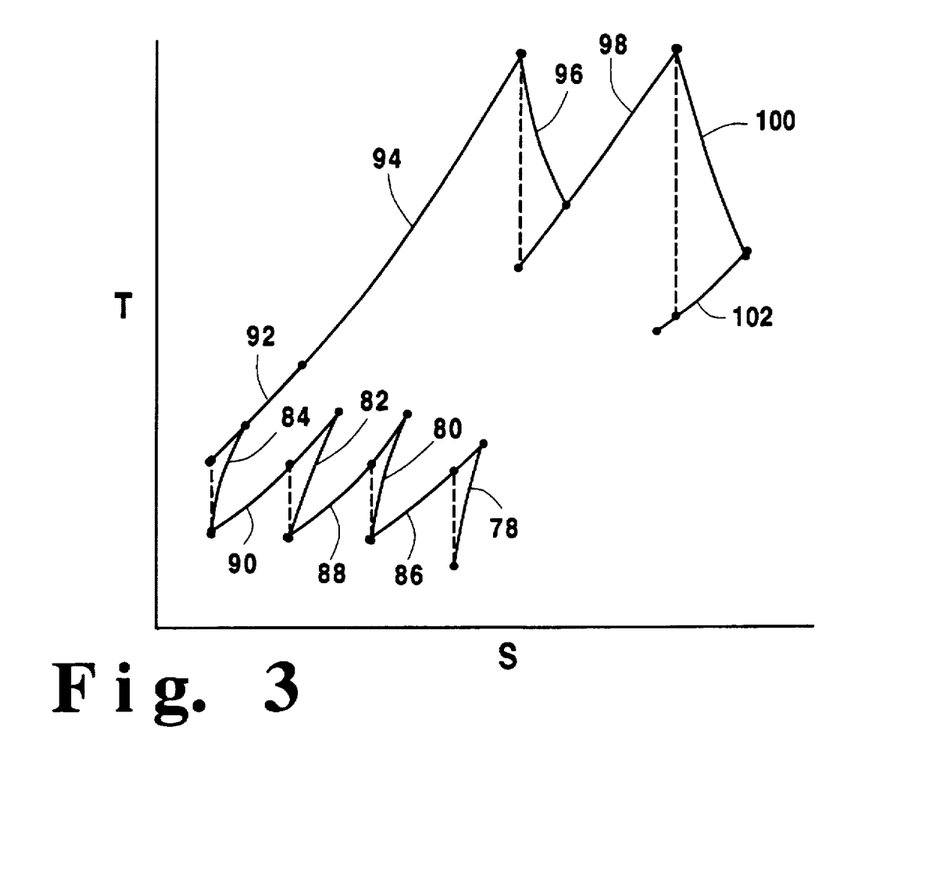
FIG. 3 is a temperature-entropy diagram of the process employed by the system of FIG. 1.

FIG. 3 depicts the processes employed by the system of FIG. 1 on a temperature-entropy diagram. Shown are compression processes for stage one 78, stage two 80, stage three 82 and stage four 84. The subsequent intercooling processes are shown also for stage one 86, stage two 88 and stage three 90. Following are a regenerative heating stage 92, a combustion stage 94, a first expansion stage 96, a reheat stage 98, a second expansion stage 100, and a regeneration stage 102. Ideal isentropic processes (appearing as vertical lines) are shown which correspond to the real, nonideal compression and expansion processes.

Figure 4:
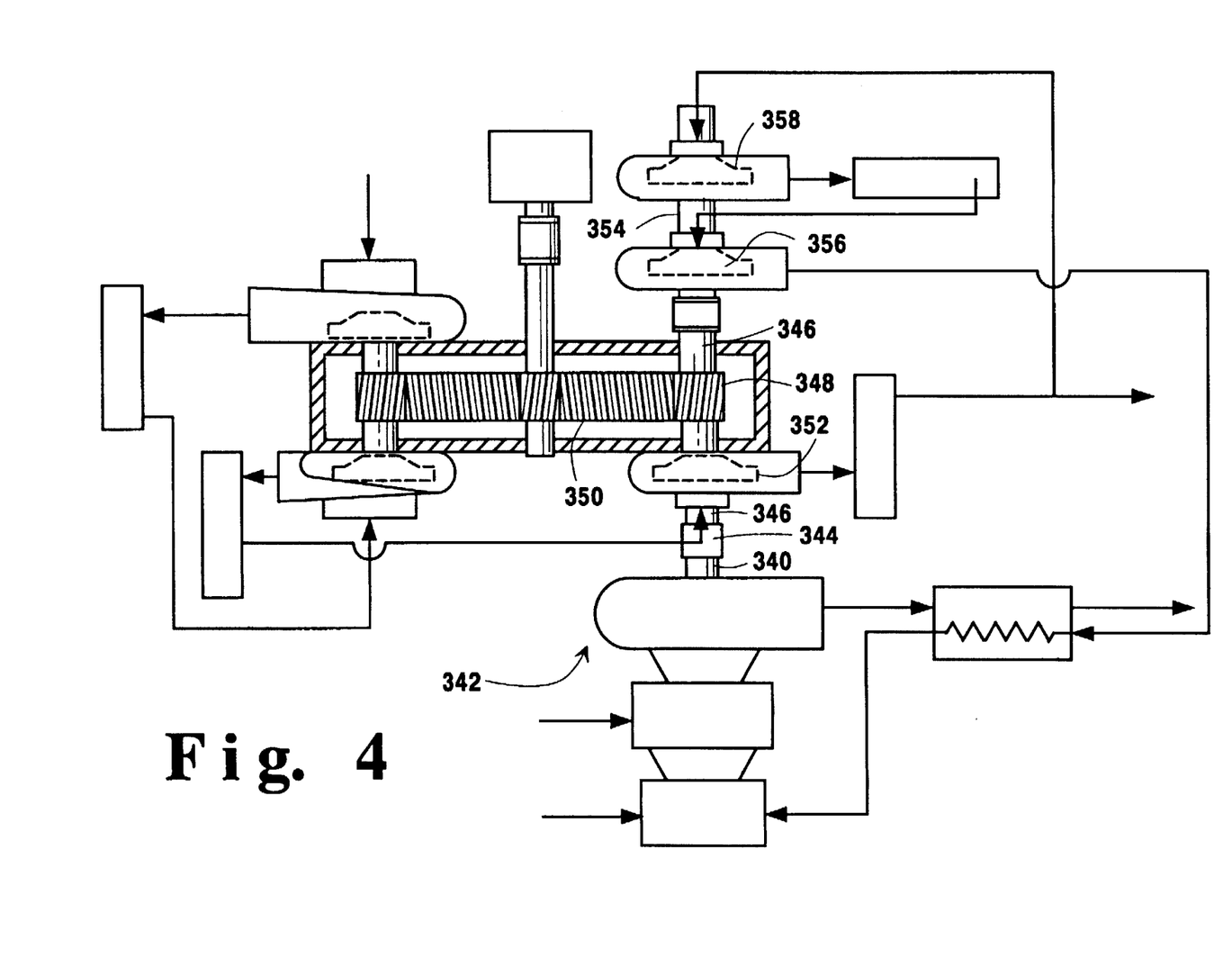
FIG. 4 is a schematic of another embodiment of the invention.

In another system embodiment shown in FIG. 4, the output shaft 340 of a combustor-turbine unit 342 is connected by a coupling 344 to a shaft 346 carrying on one of its sides a pinion 348 meshing with and driving the bull gear 350. This shaft 346 also carries an impeller 352, which with its housing, comprises a stage of compression. The other side of the pinion shaft 346 is coupled to a shaft 354 carrying two impellers 356, 358 comprising two additional stages of compression. This embodiment thus illustrates an in-line arrangement of compression stages. Other components of the embodiment in FIG. 4 are identical with components in the embodiment shown in FIG. 1.

Figure 5:
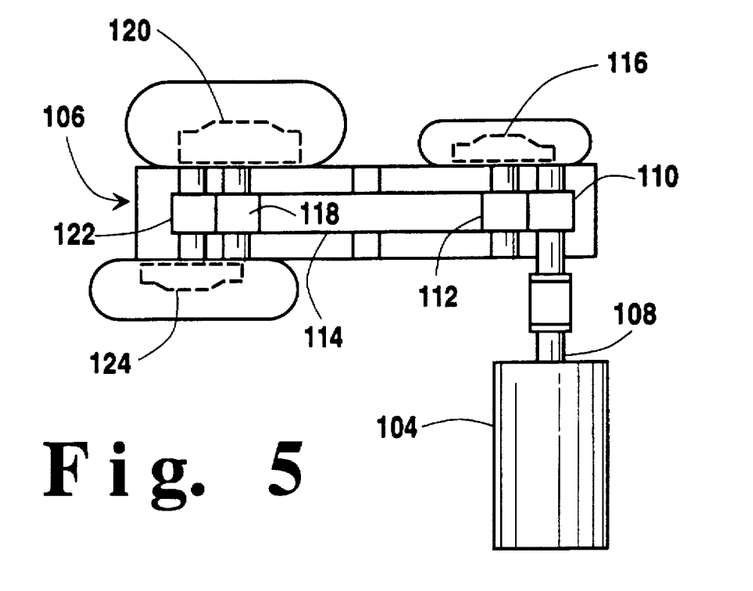
FIG. 5 is a schematic of yet another embodiment of the invention.

In yet another system embodiment, depicted in FIG. 5, a combustor-turbine unit 104 is integrated with an integral gear compressor 106 by coupling a combustor-turbine output shaft 108 with a first pinion 110 which engages with a second pinion 112 which meshes with the bull gear 114 of the compressor. On the second pinion 112 is mounted a first radial impeller 116 providing a third stage of compression. Also meshing with the bull gear 114 is a third pinion 118 on which is mounted a second radial impeller 120 providing a first stage of compression. Also meshing with the bull gear 114 is a fourth pinion 122 on which is mounted a third radial impeller 124 providing a second stage of compression.

Additional radial impellers could be installed to provide additional stages of compression, if desired. Each pinion may rotate at a different speed, depending on its diameter as selected. In the embodiment of FIG. 5, the pinions have four different diameters and rotate at four different speeds.

Between the stages of compression are intercoolers which are cooled by water, air or other available medium. For startup of the system, a motor (not shown) may be provided coupled to a second shaft (not shown) emerging from the combustor-turbine unit 104.

Figure 6:
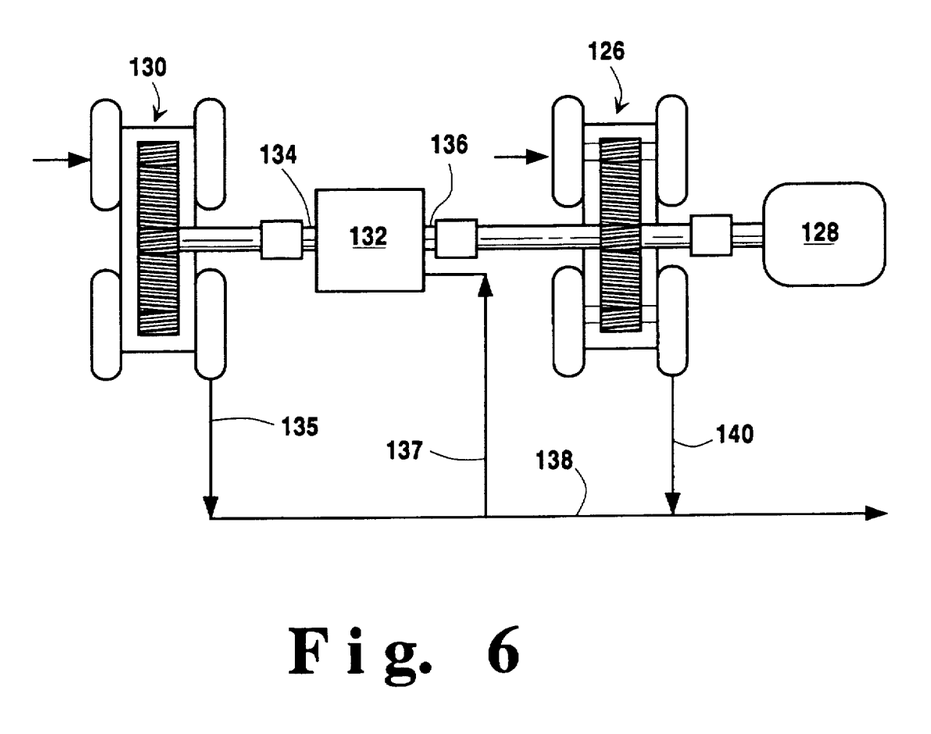
FIG. 6 is a schematic of an embodiment of the invention suitable for installation with an existing compressor driven by a motor-generator set in a process plant.

As shown in FIG. 6, an existing process compressor 126 driven by a motor-generator 128 may be readily combined with an added integral gear compressor 130 driven by a combustor-turbine unit 132. In this embodiment, the combustor-turbine unit 132 has a shaft 134 coupled to the added compressor 130 and a shaft 136 coupled to the existing compressor 126. The shafts may rotate at different speeds. During operation of the combustor-turbine unit 132, any power in excess of that used to drive the two compressors can be used in the motor-generator 128 to generate electrical power which can be used elsewhere.

As shown in FIG. 6, a stream 135 of compressed air from the new compressor 130 can be divided into a stream 137 of air to the combustor 132 and a stream 138 to the process plant. The latter stream is joined by a stream 140 of compressed air from the existing compressor 126.

Figure 7:
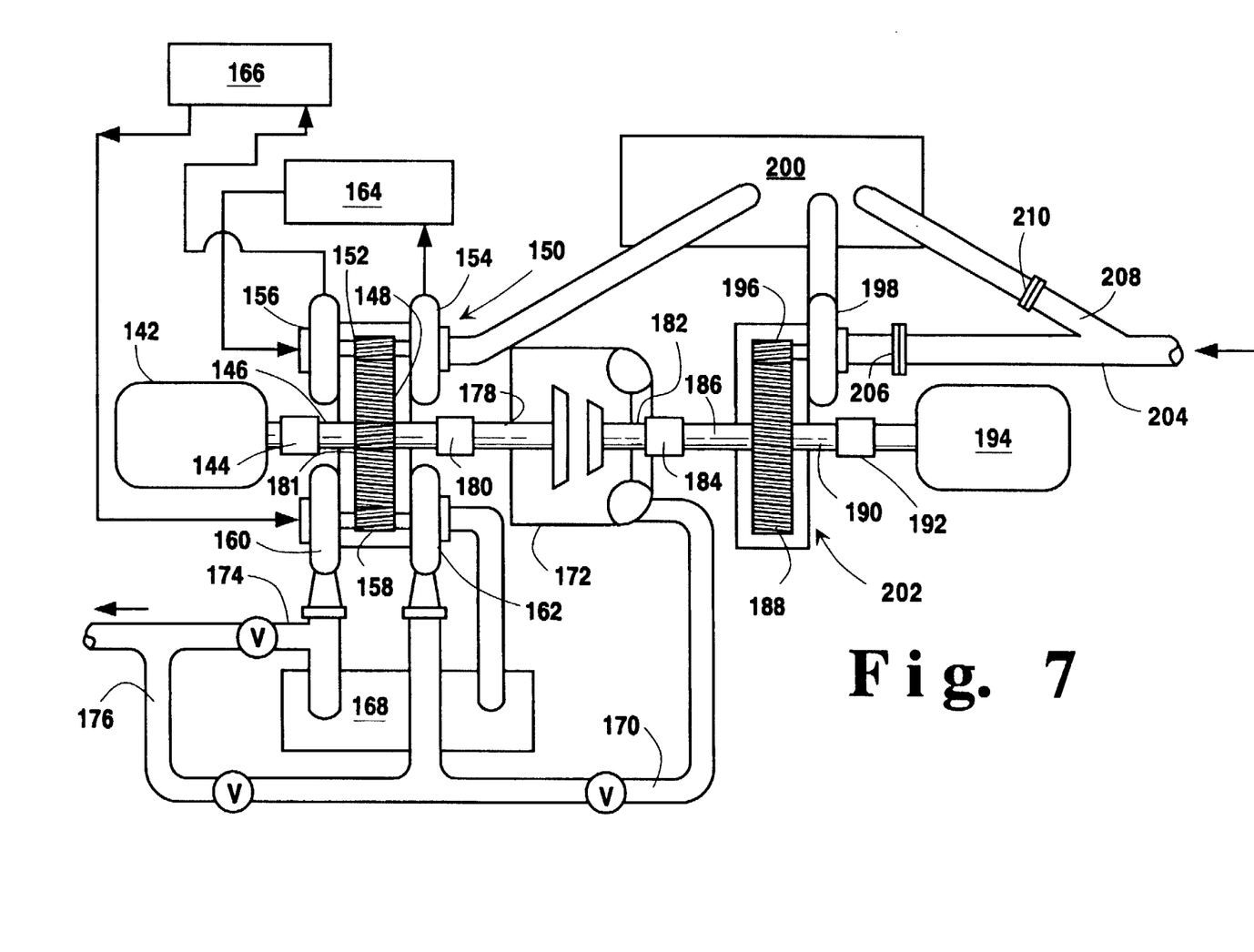
FIG. 7 is a schematic of an embodiment of the invention in which either an electric drive or a combustor-turbine unit drive may be employed. Such an embodiment is suitable for a low-risk initial installation.

Still another embodiment of the invention, shown in FIG. 7, can be used to avoid the risk of combustor-turbine failure with resulting loss of compressed air supply to a process plant. This embodiment allows drive either by an electric motor or gas turbine. A motor 142 is connected through a first coupling 144 to a shaft 146 which is integral with a first bull gear 148, which is integral with a high pressure compressor 150. Meshing with the first bull gear 148 is a first pinion 152 on which is mounted a second stage compressor stage 154 and a third stage compressor stage 156. Also meshing with the first bull gear 148 is a second pinion 158 on which is mounted a fourth compressor stage 160 and a fifth compressor stage 162. A second intercooler 164 is provided between compression stages two and three, a third intercooler 166 is provided between stages three and four, and a fourth intercooler 168 is provided between stages four and five. A stream 170 of compressed air from compression stage five 162 is ducted to the combustor of the combustor-turbine unit 172 that drives the high pressure compressor 150. A stream 174 of compressed air from compression stage four or a stream 176 of compressed air from compression stage five 162 is ducted to the process plant.

The combustor-turbine unit 172 that drives the high pressure compressor 150 has a first output shaft 178 that is connected by a second coupling 180 to a third pinion 181 that meshes with the bull gear 148. The combustor-turbine 172 has a second output shaft 182 which is connected by a third coupling 184 to a shaft 186 that is integral with a second bull gear 188. Emanating from the center of the other side of the second bull gear 188 is a shaft 190 that is connected by a fourth coupling 192 to a motor generator 194.

Meshing with the second bull gear 188 is a fourth pinion 196 on which is mounted a first stage compression stage 198 which discharges into a first intercooler 200. The second bull gear 188 and the first compression stage 198 comprise a low pressure compressor 202 which discharges into the first intercooler 200, from which cooled compressed air is ducted to the second compression stage 154 on the high pressure compressor 150. Intake air is provided to the first compression stage compression 198 through an air supply duct 204 which includes a first pair of flanges 206 capable of receiving a blank plate to close off the suction to the first compression stage 198 when desired. Branching from the air supply duct 204 is a duct 208 having a second pair of flanges 210 normally retaining a blank plate. Valves could be used in place of the flanges 206 and 210.

In normal startup of the system for steady state drive by the combustor-turbine unit, the motor 194 drives the low pressure compressor 202, the high pressure compressor 150 and the combustor-turbine unit 172. For normal steady, combustor-turbine drive operation, the motor 142 is uncoupled and the combustor-turbine unit 172 drives the high pressure compressor 150 and the low pressure compressor 202 and the motor-generator 194. The electric power generated is used elsewhere in the process plant. The first pair of flanges 206 are unblanked and the second pair of flanges 210 are blanked.

When the combustor-turbine unit 172 is not operational and motor drive is employed, the motor 142 drives the high pressure compressor 150 which is uncoupled from the rest of the equipment by coupling 180. The first pair of flanges 206 are blanked, and the second pair of flanges 210 are unblanked allowing uncompressed air directly into the first intercooler 200 and on into the high pressure compressor 150. During motor drive of the system, no air is required for the combustor-turbine unit 172, and compressed air is supplied to the process plant from the fifth compressor stage 162 on the high pressure compressor 150. With the low pressure compressor 202 bypassed, the density of the flow at the inlet to high pressure compressor 150 is reduced. However, the stages are matched such that the high pressure compressor 150 meets the compressed air pressure and flow requirements of the process plant. To facilitate optional operation or nonoperation of the motor 142, the motor-generator 194, the combustor-turbine unit 172, the low pressure compressor 202, and the high pressure compressor 150, the coupling devices 144, 178, 184 and 192 may be clutches or other easily connectable and disconnectable devices.

Figure 8:
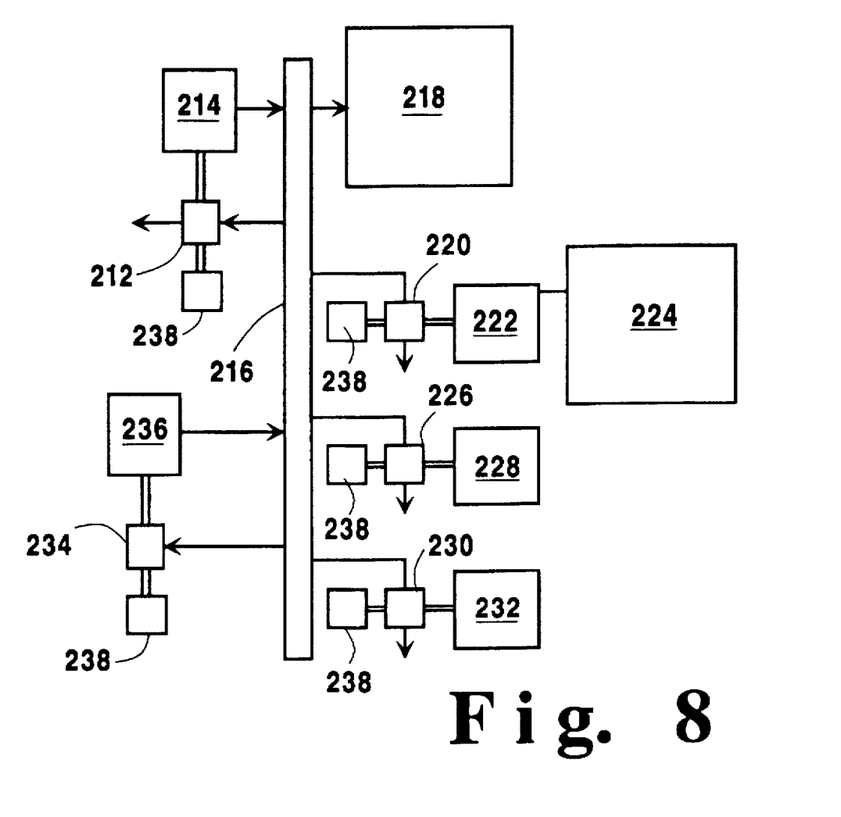
FIG. 8 is a schematic of an embodiment of the invention suitable for integrating multiple combustor-turbine units respectively driving air compressors, recycle compressors, product compressors, and generator-motor sets.

In FIG. 8 is depicted a system embodiment integrating combustor-turbine units, compressors, and generator-motors 238 to supply compressed air to a process plant and to a supply line leading to off site users. The system also generates electrical power which is available for on-site use. In the system, a first combustor-turbine unit 212 drives a first compressor 214 supplying air into a pipeline 216. The pipeline 216 supplies air to the first combustion-turbine unit 212, to other on-site combustor-turbine units 220, 226, 230, 234, to an on-site process plant 218 and to off-site users. A second combustor-turbine unit 220 drives a recycle compressor 222 compressing nitrogen in a gas liquefier plant 224. A third combustor-turbine unit 226 drives a nitrogen gas product compressor 228 and a fourth combustor-turbine unit 230 drives an oxygen gas product compressor 232. A fifth combustor-turbine unit 234 drives a supplemental air compressor 236 to supply compressed air to the air supply line 216 as needed. Any or all of the combustor-turbine units may be coupled to starter-generators such as starter-generators 238. Other compressors compressing additional fluid streams can be added to the system.

Figure 9:
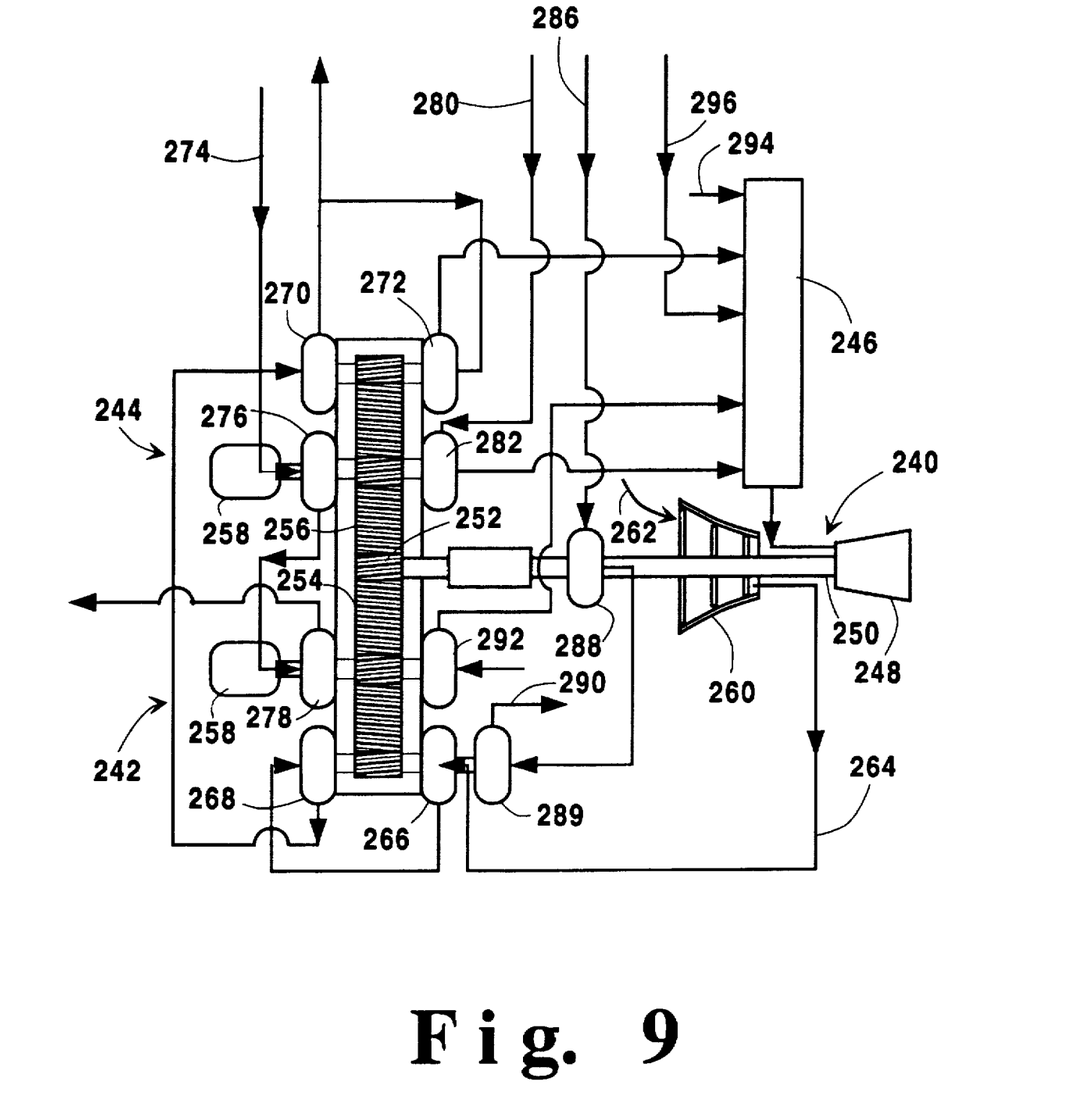
FIG. 9 is a schematic of an embodiment of the invention having two integral-gear compressors driven by one combustor-turbine unit.

FIG. 9 depicts an embodiment of the invention comprising a combustor-turbine unit 240 driving a first integral gear pressure processor 242 and a second 244 integral gear pressure processor. The combustor-turbine unit has a combustor 246 supplying hot gas to the turbine 248 which drives an output shaft 250. The output shaft is coupled into a pinion 252 which meshes with the bull gear 254 of the first integral gear pressure processor and with the bull gear 256 of the second integral gear pressure processor. Coupled to each bull gear is a starter-generator 258, either of which is used to start the combustor-turbine unit. After the combustor-turbine unit is in operation, the starter-generators can be used to generate electrical power for other uses.

Each of the integral-gear pressure processors has a number of pressure processing stages. Some of the stages may be connected for flow in series. Connection may be limited to a single pressure processor or may extend from one processor to another. Typically intercoolers are used in between compressor stages and after compressor stages. A pressure processing stage typically comprises a housing containing an impeller mounted on a pinion meshing with a bull gear of a pressure processor.

Mounted on the combustor-turbine unit shaft 250 is a combustor-turbine unit pressure processing stage 260 which serves to compress a stream of air 262 drawn from the atmosphere. A conduit 264 connects the discharge of the combustor-turbine unit pressure processing stage 260 with the inlet of a pressure processing stage 266 of one of the integral-gear pressure processors. The stream of air is compressed in a number of subsequent pressure processing stages 266, 268 and 270, and then a portion is ducted to a process plant, such as a cryogenic air separation plant or another combustor-turbine unit. Another portion is ducted to one or more optional additional pressure processing stages 272 and then to the combustor-turbine unit for combustion with fuel. The outlet pressure from the final pressure processing stage is selected to match the operating pressure of the combustor.

A number of other gas streams can be processed simultaneously in one or more integral gear pressure processors. Examples are depicted in FIG. 9. A stream of nitrogen product gas 274 such as from an air separation plant is compressed in two stages 276 and 278 to a pressure desired by a user and delivered into a pipeline for transport to using stations.

A pressurized waste gas stream 280, available at some pressure intermediate atmospheric pressure and combustor operation pressure, is boosted in pressure to combustor operating pressure in a stage 282 and ducted to the combustor in the combustor-turbine unit. Thus energy equivalent to compressing an air stream of equal mass from atmospheric pressure to the initial pressure of the waste gas stream is saved. This procedure is particularly beneficial where the process plant is an air separation plant operating with a low-pressure column pressure at a higher pressure than typical, i.e., in what is termed a high pressure plant. In such a plant the low pressure column is operated at pressures up to 70 psia compared to a typical pressure of 17 psia. The waste gas stream is boosted to combustor pressure which may range from about 100 psia to about 300 psia, typically 215 psia, in a pressure processor driven by a combustor-turbine unit. Such a waste gas stream from an air separation plant is typically enriched in nitrogen relative to air and will provide the additional benefit of lowering the oxygen concentration in the combustor thereby reducing the formation of oxides of nitrogen which upon emission pollute the atmosphere.

To recover energy, a high pressure waste steam stream 286 or a waste gas stream from a process plant may be expanded in a stage 288 mounted on the combustor-turbine unit output shaft 250, and successively or alternatively in a stage 289 in one of the integral-gear pressure processors. A fuel gas stream 290 from a process plant or from a general utility gas supply main may be compressed in a stage 292 in a pressure processor and directed into the combustor-turbine unit. An available steam stream 294 can be introduced into the combustor for power augmentation and emission control. Any beneficial stream 296 having a pressure at least somewhat higher than the combustor pressure can be introduced directly into the combustor 246.

ANALYTICAL EXAMPLE

An analysis was made comparing power costs for supplying compressed air to two air separation plants. The first plant employed a combustor-turbine unit to drive an integral-gear compressor supplying compressed air to both the air separation plant and to the combustor-turbine unit pursuant to this invention. The combustor-turbine unit and compressor schematically conformed to the depiction in FIG. 1 and operated according to the processes shown in FIG. 3. The integral-gear air compressor had four stages. Compressed air was supplied to the air separation plant after three stages of compression with a compression ratio of 1,905 per stage. Compressed air was supplied to the combustor-turbine unit after an additional stage with a compression ratio of 1.6.

The second plant conventionally employed an electric motor to drive an integral-gear air compressor supplying compressed air to the air separation plant. This compressor is also shown in FIG. 1, except as follows. The air compressor had only three stages of compression, each with a compression ratio of 1.9. Compressed air take-off to the air separation plant was at the same pressure as in the first plant, namely at 96.5 psia. The fourth compression stage, the combustor-turbine, and its regenerative heat exchanger were not present.

Both plants were sized to produce nominally 160 tons per day of oxygen product. The air flow required was 796,000 scfh at a suction pressure of 14.6 psia and a suction temperature of 68° F. The pressure drop in each intercooler was 0.75 psi, and in the combustor, regenerator, and reheater 2.0 psi each. Cooling water was available at 68° F., and the temperature approach in the intercoolers was 10° F. The compressor stage efficiency was 85.5%, the turbine stage efficiency 90.0%, and the mechanical loss 3%. The regenerative heat exchanger operated at 90% effectiveness. Electricity was assumed to cost $0.04 per kw-hr, and the natural gas fuel for the combustor-turbine unit, $3.00 per 1000 cu. ft.

With the plants operating 8500 hours per year, the yearly power cost for the first plant was $290,000, and for the second plant $560,000. Thus operation pursuant to the invention produced a cost savings for power of 48.7%.

Although the invention has been described with a degree of particularity, the present disclosure has been made only by way of example, and numerous changes in the details and arrangement of the apparatus and the process may be resorted to without departing from the spirit and scope of the invention as hereinafter claimed.

What is claimed is:

1. A system for supplying a compressed gas stream to an air separation plant, comprising:
   (a) a combustor-turbine unit having an output shaft;
   (b) a first integral-gear pressure processor having:
      (1) a bull gear;
      (2) at least one integral-gear pressure processing stage for compressing said gas stream, said stage drivingly coupled to said bull gear and having an inlet and an exit;
   (c) a conduit from one of said at least one integral-gear pressure processing stages, being connectable to the air separation plant, for withdrawal of a portion of said gas stream;
   (d) a conduit from one of said at least one integral-gear pressure processing stages to said combustor-turbine unit, for ducting a portion of said gas stream to said combustor-turbine unit; and
   (e) means for driving said bull gear with said combustor-turbine unit output shaft, said means comprising a driving pinion coupled to said combustor-turbine unit output shaft and meshing with said bull gear; or a driving pinion coupled to said combustor-turbine unit output shaft and meshing with another pinion meshing with said bull gear.

2. The system as in claim 1 further comprising at least one integral-gear pressure processing stage for expansion of a gas stream.

3. The system as in claim 1 further comprising at least one combustor-turbine-unit pressure processing stage drivingly engaged with a turbine shaft of said combustor-turbine unit.

4. The system as in claim 3 further comprising a conduit connecting at least one of said at least one combustor-turbine-unit pressure processing stages with at least one of said at least one integral-gear pressure processing stages.

5. The system as in claim 1 further comprising:
   (f) a second integral-gear pressure processor having:
      (1) a bull gear; and
      (2) at least one integral-gear pressure processing stage drivingly engaged with said bull gear; and wherein said means for driving the bull gear of said first integral-pressure processor comprises a pinion which meshes with both the bull gear of said first integral-gear pressure processor and the bull gear of said second integral-gear pressure processor.

6. The system as in claim 1 further comprising:
   (f) a second integral-gear pressure processor having:
      (1) a bull gear drivingly connected to said combustor-turbine unit output shaft; and
      (2) at least one integral-gear pressure processing stage with an inlet to atmospheric air and an exit, said processing stage drivingly connected to said bull gear; and
   (g) means for optionally communicating the inlet of one of said at least one pressure processing stage of said first integral-gear pressure processor either to atmospheric air or to the exit of said second integral-gear pressure-processor pressure processing stage.

* * * * *

UNITED STATES PATENT AND TRADEMARK OFFICE
CERTIFICATE OF CORRECTION

PATENT NO. : 5,485,719
DATED : January 23, 1996
INVENTOR(S) : James B. Wulf

It is certified that error appears in the above-indentified patent and that said Letters Patent is hereby corrected as shown below:

Column 10

In claim 6, steps (f) and (g) should be replaced with letters (g) and (h) respectively.

Column 10
Add claim 7
--7. The system as in claim 5 further comprising means for optionally disconnecting driving connection between said second integral-gear pressure processor and said combustor-turbine unit output shaft.--

Signed and Sealed this

Second Day of July, 1996

Attest:

BRUCE LEHMAN

*Attesting Officer*   Commissioner of Patents and Trademarks